(12) United States Patent
Laurance

(10) Patent No.: US 10,807,383 B2
(45) Date of Patent: Oct. 20, 2020

(54) ROBOTIC PRINTING SYSTEM FOR AN AIRCRAFT EXTERIOR

(71) Applicant: The Boeing Company, Chicago, IL (US)

(72) Inventor: Steven Laurance, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/139,482

(22) Filed: Sep. 24, 2018

(65) Prior Publication Data

US 2020/0094577 A1    Mar. 26, 2020

(51) Int. Cl.
| | |
|---|---|
| *B41J 3/407* | (2006.01) |
| *B05B 15/62* | (2018.01) |
| *B05B 12/00* | (2018.01) |
| B25J 5/00 | (2006.01) |
| B25J 11/00 | (2006.01) |
| B41J 25/304 | (2006.01) |
| B41M 5/00 | (2006.01) |

(52) U.S. Cl.
CPC ........... *B41J 3/4073* (2013.01); *B05B 12/004* (2013.01); *B05B 15/62* (2018.02); *B25J 5/00* (2013.01); *B25J 11/0075* (2013.01); *B41J 25/304* (2013.01); *B41M 5/0082* (2013.01); *G05B 2219/45013* (2013.01)

(58) Field of Classification Search
CPC ....... B41J 3/4073; B41J 25/304; B05B 15/62; B05B 12/004; B25J 11/0075; B25J 5/00; B41M 5/0082; G05B 2219/45013
See application file for complete search history.

(56) References Cited

U.S. PATENT DOCUMENTS 2,618,889 A * 11/1952 Wigal ..................... A63H 11/04
446/138
2,728,168 A * 12/1955 Gier ...................... A63H 11/205
446/177

(Continued)

FOREIGN PATENT DOCUMENTS

| CN | 102 866 201 | 1/2013 |
|---|---|---|
| DE | 10 2016 204123 | 10/2016 |

(Continued)

OTHER PUBLICATIONS

Extended European Search Report prepared by the European Patent Office in application No. EP 19 18 4352.3 dated Jan. 3, 2020.

*Primary Examiner* — Scott A Richmond
(74) *Attorney, Agent, or Firm* — McDonnell Boehnen Hulbert & Berghoff LLP

(57) ABSTRACT

A robotic printing system for an exterior surface of an aircraft includes a robotic printer, the robotic printer having a body and a plurality of vacuum suction cups mounted to the body for attaching the robotic printer to the exterior surface of the aircraft, where the plurality of vacuum suction cups are configured to move the robotic printer along the exterior surface of the aircraft. The robotic printer also includes a printing head mounted to the body, where the printing head is positioned to apply a print medium to the exterior surface of the aircraft. The robotic printer also includes a laser-based positioning device mounted to the body for determining a position of the robotic printer on the exterior surface of the aircraft.

20 Claims, 7 Drawing Sheets

(56) References Cited

U.S. PATENT DOCUMENTS

| | | | |
|---|---|---|---|
| 3,061,972 A * | 11/1962 | Wigal | A63H 17/004 |
| | | | 446/177 |
| 4,477,998 A * | 10/1984 | You | A63H 11/04 |
| | | | 446/177 |
| 6,843,328 B2 | 1/2005 | Boyl-Davis et al. | |
| 7,134,649 B2 | 11/2006 | Boyl-Davis et al. | |
| 7,350,890 B2 | 4/2008 | Baird et al. | |
| 7,887,191 B2 | 2/2011 | Dill et al. | |
| 7,922,272 B2 | 4/2011 | Baird et al. | |
| 8,088,450 B2 | 1/2012 | Swanberg et al. | |
| 9,839,986 B2 | 12/2017 | Best et al. | |
| 9,937,731 B2 | 4/2018 | Mathis et al. | |
| 2004/0141784 A1 * | 7/2004 | Patton | B41J 3/4073 |
| | | | 400/323 |
| 2015/0096777 A1 * | 4/2015 | Albert | B23Q 1/621 |
| | | | 173/184 |
| 2017/0362845 A1 * | 12/2017 | Korenfeld | G05D 1/00 |
| 2019/0038091 A1 * | 2/2019 | Nam | A47L 11/4047 |
| 2019/0102965 A1 * | 4/2019 | Greyshock | G07F 11/165 |

FOREIGN PATENT DOCUMENTS

| | | |
|---|---|---|
| EP | 2 781 438 | 9/2014 |
| WO | WO 03/101664 | 12/2003 |

* cited by examiner

ROBOTIC PRINTING SYSTEM FOR AN AIRCRAFT EXTERIOR

FIELD

The present disclosure generally relates to robotic printing systems and methods of operation to print an image on an exterior surface of an aircraft.

BACKGROUND

Application of a decorative livery design to the exterior surface of an aircraft can be a time-consuming process. Current solutions include creation of large-scale design templates (made of, for example, plastic substrates such as Mylar®, made by DuPont Teijin Films) that are temporarily placed on the aircraft exterior. These large-scale design templates are then used as the basis for masking sections of the aircraft for the application of each color in a livery design, which are applied after the templates are removed. The creation of the design templates can be an iterative process, and the templates eventually must be replaced due to damage or due to changes in the livery design. Further, different templates are required for different models of aircraft and for different airline livery designs, each requiring the storage and maintenance for their intended reuse.

There is a need for improved systems and methods for applying decorative images on the exterior surface of an aircraft.

SUMMARY

In one example, a robotic printing system for an exterior surface of an aircraft is described including a robotic printer, the robotic printer having a body and a plurality of vacuum suction cups mounted to the body for attaching the robotic printer to the exterior surface of the aircraft, where the plurality of vacuum suction cups are configured to move the robotic printer along the exterior surface of the aircraft. The robotic printer also includes a printing head mounted to the body, where the printing head is positioned to apply a print medium to the exterior surface of the aircraft. The robotic printer also includes a laser-based positioning device mounted to the body for determining a position of the robotic printer on the exterior surface of the aircraft.

In another example, a method of printing an image on an exterior surface of an aircraft is described. The method includes attaching a robotic printer to the exterior surface of the aircraft via a plurality of vacuum suction cups mounted to a body of the robotic printer, the robotic printer further including a laser-based positioning device and a printing head mounted to the body. The method also includes determining, via the laser-based positioning device, relative position data with respect to the laser-based positioning device for each of a plurality of reference points corresponding to the exterior surface of the aircraft. The method also includes, based on the relative position data, determining a position of the robotic printer on the exterior surface of the aircraft. The method also includes, based on the relative position data, mapping the position of the robotic printer to a three-dimensional model of the exterior surface, where the three-dimensional model includes a representation of the image on the exterior surface. The method also includes, based on the mapping of the robotic printer to the three-dimensional model, applying, via the printing head, a print medium to a location on the exterior surface of the aircraft corresponding to the representation of the image in the three-dimensional model. The method also includes moving the robotic printer along the exterior surface of the aircraft via the plurality of vacuum suction cups.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include robotic printing systems and methods of operation to print an image on an exterior surface of an aircraft. The robotic printing system may include a robotic printer having a plurality of vacuum suction cups for attaching the robotic printer to, and moving it along, the exterior surface of the aircraft. The robotic printer may further include a printing head for applying a print medium to the exterior surface, and a laser-based positioning device for determining the position of the robotic printer on the aircraft and mapping that position to a three-dimensional model of the aircraft that includes a representation of the image to be printed. Accordingly, the robotic printer may move along the exterior surface of the aircraft and apply the print medium at locations corresponding to the representation of the image in the three-dimensional model.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
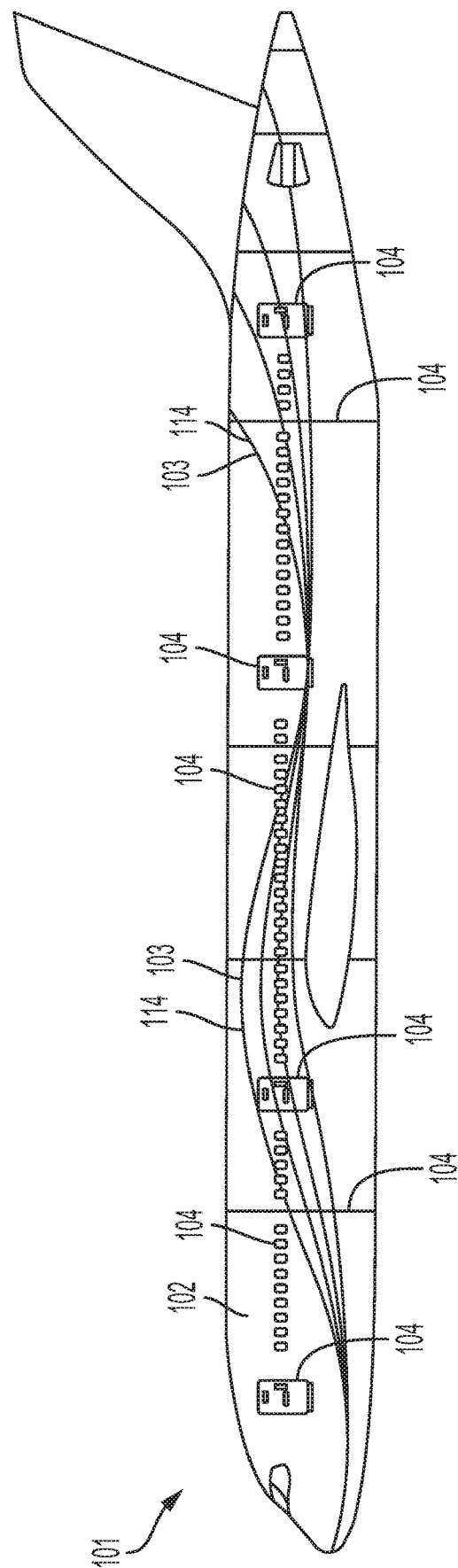
FIG. 1 illustrates a side view of an exterior surface of an aircraft, according to an example implementation.

Referring now to FIG. 1, a side view of an aircraft 101 is shown, according to an example embodiment. The aircraft includes an exterior surface 102, on which an image 103 can be seen. For example, the image 103 may correspond to color boundaries in a decorative livery design for the aircraft 101. The decorative livery design may identify the air carrier, or perhaps the manufacturer of the aircraft. Once applied to the aircraft 101, the image 103 may thus provide a template to facilitate masking portions of the exterior surface 102 (e.g., with tape) in preparation for more large-scale paint application within the color boundaries. The image 103 may be applied with a print medium 114, which may be paint, ink, or any other medium capable of being applied to the exterior surface 102 of the aircraft 101 to create the image 103.

The exterior surface 102 of the aircraft 101 also includes a plurality of surface features 104, several of which are indicated in FIG. 1. The surface features 104 may include, for instance, a door, a window, or a seam where adjacent sections of the fuselage of the aircraft 101 join each other. Other examples of surface features 104 are also possible. As discussed further below, a robotic printing system 100 may utilize the surface features 104 as reference points to index the location of a robotic printer to the exterior surface 102 of the aircraft 101, allowing the image 103 to be applied according to a three-dimensional model of the aircraft 101 that includes a representation of the image 103, for example.

Figure 2:
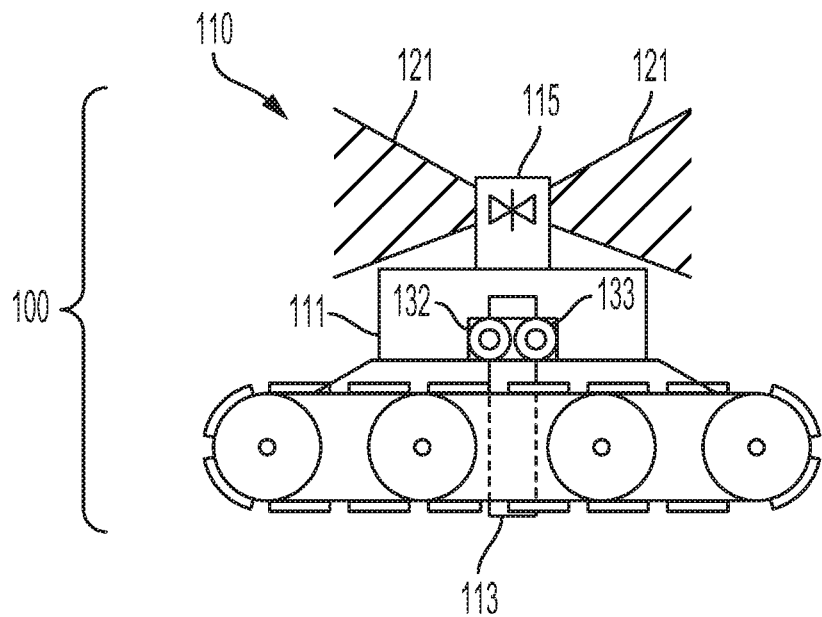
FIG. 2 illustrates a side view of a robotic printing system for an exterior surface of an aircraft, according to an example implementation.
Figure 3:
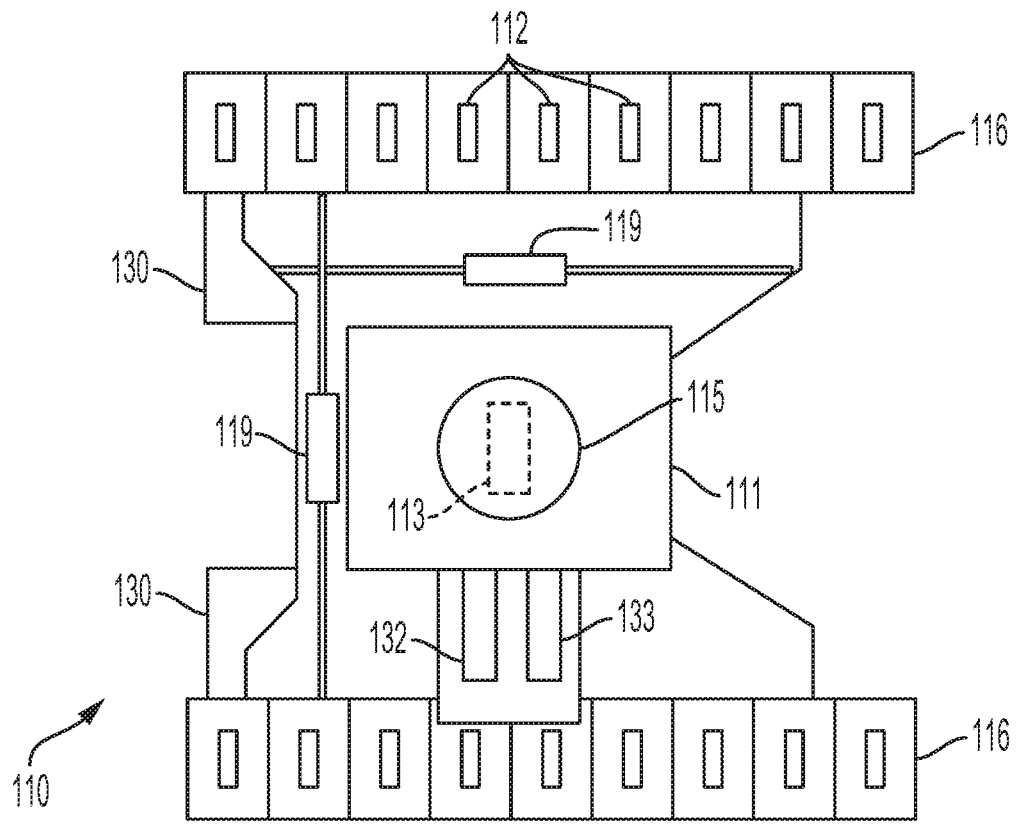
FIG. 3 illustrates a top view of a robotic printing system for an exterior surface of an aircraft, according to an example implementation.

FIG. 2 shows a side view of a robotic printer 110, and FIG. 3 shows a top view of the robotic printer 110, according to an example embodiment. The robotic printer 110 includes a body 111 to which other components of the robotic printer 110 may be attached. For example, the robotic printer 110 includes a plurality of vacuum suction cups 112 mounted to the body 111 for attaching the robotic printer 110 to the exterior surface 102 of the aircraft 101. Each vacuum suction cup 112 may be part of an assembly that includes, for example, vacuum tubing that couples a vacuum pressure source to the vacuum suction cup 112. Further, the plurality of vacuum suction cups 112 are configured to move the robotic printer 110 along the exterior surface 102 of the aircraft 101, as discussed below.

For instance, as shown in FIGS. 2 and 3, the plurality of vacuum suction cups 112 are arranged on a pair of parallel treads 116 that are configured to drive the robotic printer 110 along the exterior surface 102 of the aircraft 101. This may allow the robotic printer 110 a greater range of movement than some other robotic systems that are used in aircraft assembly. In some implementations, the pair of parallel treads 116 may each include a respective drive motor 130, which may drive the rotation of the pair of treads 116, thereby moving the robotic printer 110.

Figure 4:
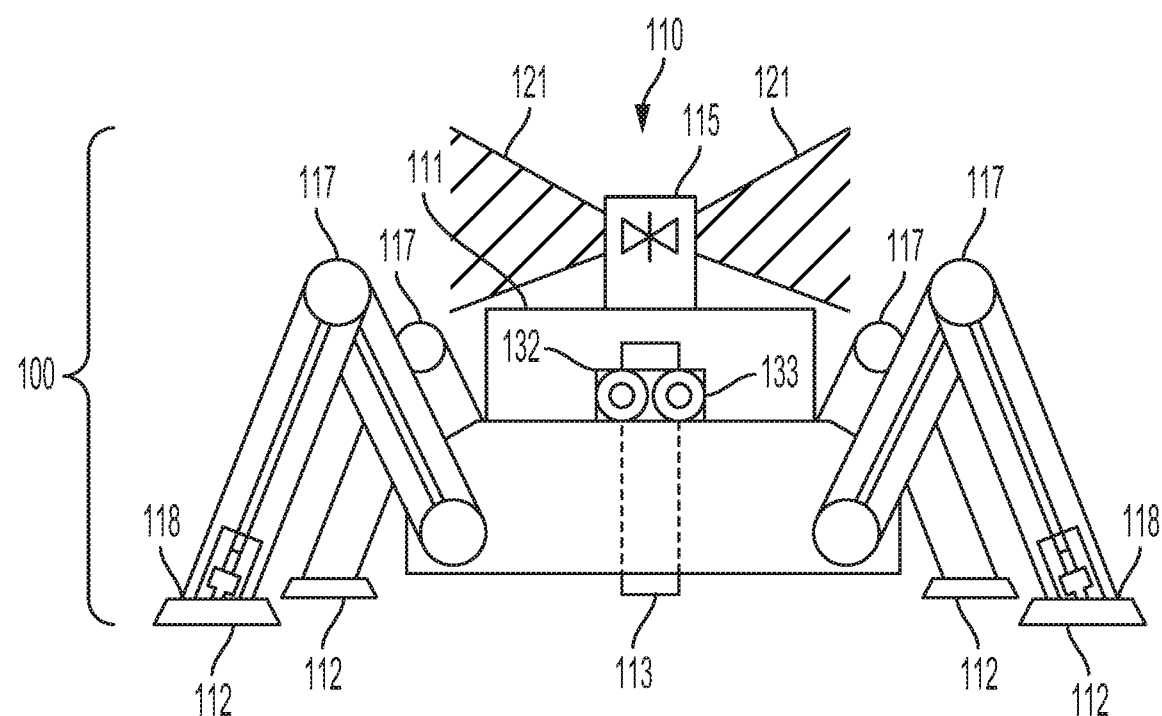
FIG. 4 illustrates a side view of a robotic printing system for an exterior surface of an aircraft, according to an example implementation.

An alternative example is shown in FIG. 4, in which the plurality of vacuum suction cups 112 are arranged at respective ends 118 of a plurality of legs 117 configured to move the robotic printer 110 along the exterior surface 102 of the aircraft 101. The example shown in FIG. 4 includes four legs, although more or fewer legs are also possible. Otherwise, the robotic printer 110 in FIG. 4 may include substantially similar features to those shown in the robotic printer 110 in FIGS. 2 and 3.

Returning to FIGS. 2 and 3, the robotic printer 110 further includes a printing head 113 mounted to the body 111. The printing head 113 is positioned to apply a print medium, such as the print medium 114 shown in FIG. 1 and discussed above, to the exterior surface 102 of the aircraft 101. For example, the print head 113 may include one or more nozzles or jets to apply the print medium 114. The printing head 113 may be mounted to approximately the center of the body 111, between the pair of parallel treads 116, and on an underside of the robotic printer 110. In this configuration, the printing head 113 can apply the print medium 114 to the exterior surface 102 of the aircraft 101 as the robotic printer 110 moves along the exterior surface 102.

In some embodiments, the robotic printer 110 may include one or more positioning motors 119 coupled to the printing head 113. The one or more positioning motors 119 may be configured to adjust a position of the printing head 113 relative to the body 111 and the plurality of vacuum suction cups 112. For example, as the robotic printer 110 moves along the exterior surface 102 via the plurality of vacuum suction cups 112, it may be possible to position the printing head 113 along a desired travel path within a given tolerance, such as plus or minus two inches. Within this tolerance window, the one or more positioning motors 119 may allow the robotic printer 110 to make finer adjustments to the position of the printing head 113 than may be possible relying only on the movement of the robotic printer 110 via the plurality of vacuum suction cups 112. For instance, this may allow the robotic printer 110 to more efficiently avoid gaps or overlaps in the application of the print medium 114. As shown in FIG. 3, the printing head 113 may be coupled to two positioning motors 119, allowing the printing head 113 to move along two perpendicular axes.

In some implementations, the robotic printing system 100 also includes an umbilical line 120 attached to the body 111. An example of the umbilical line 120 can be seen in FIGS. 5 and 6, and will be discussed further below. In FIG. 2, an electrical port 132 is shown on the body 111 of the robotic printer 110. The umbilical line 120 may be attached to the electrical port 132 to provide electrical power to the robotic printer 110. Similarly, a vacuum port 133 is shown on the body 111 adjacent to the electrical port 132. The umbilical line 120 may be attached to the vacuum port 133 to provide vacuum pressure to the robotic printer 110, which may be transferred to the plurality of vacuum suction cups 112. In some implementations, the umbilical line 120 may convey paint or ink from a remote supply to the printing head 113. Other examples are also possible.

The robotic printer 110 shown in FIGS. 2 and 3 further includes a laser-based positioning device 115 mounted to the body 111 for determining a position of the robotic printer 110 on the exterior surface 102 of the aircraft 101. For example, the laser-based positioning device 115 may include a light source such as a laser, a rotating mirror, and a sensor for detecting light, such as a photodiode. Other arrangements of the laser-based positioning device 115 are also possible.

The laser-based positioning device 115 includes a line of sight 121, shown conceptually in FIG. 2. The robotic printer 110 may be configured to determine relative position data with respect to the laser-based positioning device 115 for each surface feature 104 within its line of sight 121. Additionally, the robotic printer 110 may be configured to determine the position of the robotic printer 110 on the exterior surface of the aircraft 101, as noted above, based on the relative position data for each surface feature 104 in the plurality of surface features 104.

For instance, based on the relative position data obtained via the laser-based positioning device 115, the robotic printing system 100 may map the position of the robotic printer 110 to a three-dimensional model of the exterior surface 102 of the aircraft 101. For instance, the three-dimensional model of the aircraft 101 may be an engineering drawing used for the design and assembly of the aircraft 101. Thus, the surface features 104 on the exterior surface 102 may have corresponding features within the three-dimensional model. Accordingly, the relative position of the robotic printer 110 in relation to the surface features 104 in real space can be translated to the three-dimensional model, providing an accurate mapping of the location of the robotic printer 110 within the three-dimensional model.

Further, the three-dimensional model includes a representation of the image 103 that is to be applied to the exterior surface 102. As noted above, the image 103 may correspond to color boundaries in the decorative livery design of the aircraft. Based on the mapped position of the robotic printer 110 and, by extension, the printing head 113, the robotic printer 110 may apply the print medium 114 at a location corresponding to the representation of the image 103 in the three-dimensional model. As the robotic printer 110 moves along the exterior surface 102, the relative position data and the mapped position of the robotic printer 110 will be updated, and the printing head 113 may apply the print medium 114 accordingly.

The robotic printer 110 may be initially attached to the exterior surface 102 of the aircraft 101 at an initial mounting position, which may be on the underside of the aircraft 101. For example, the robotic printer 110 may be raised, in an inverted position, manually or by a hydraulic or otherwise motorized lift until the plurality of vacuum suction cups 112 are attached to the exterior surface 102. Once attached, the lift may be lowered and the robotic printer 110 begins moving along the exterior surface 102. Other initial mounting positions on the exterior surface 102 of the aircraft 101 are also possible.

Figure 5:
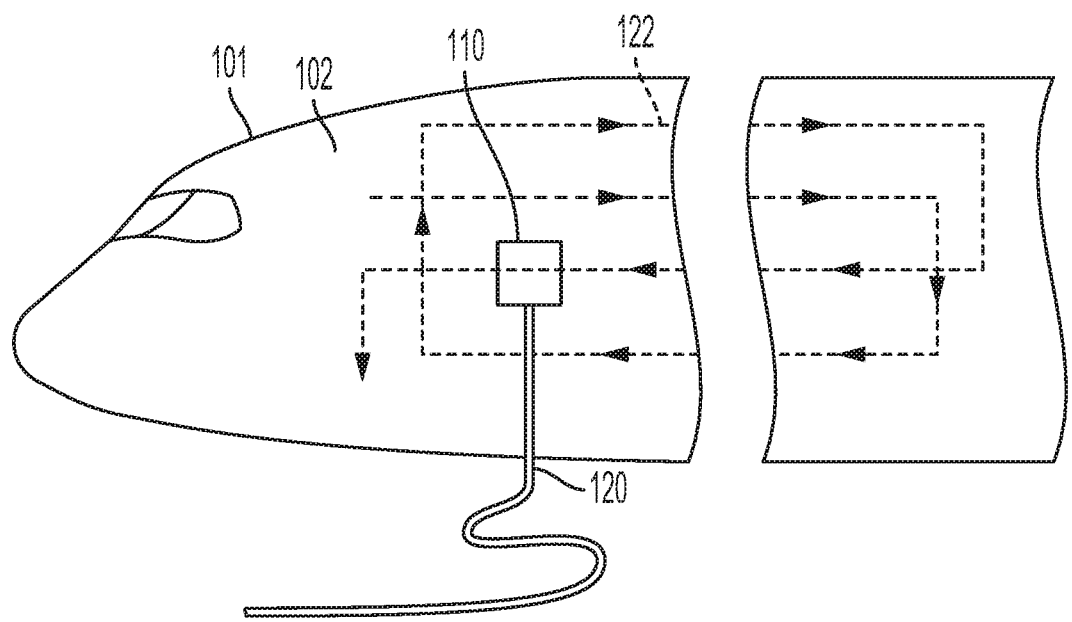
FIG. 5 illustrates an example travel path for a robotic printing system for an exterior surface of an aircraft, according to an example implementation.
Figure 6:
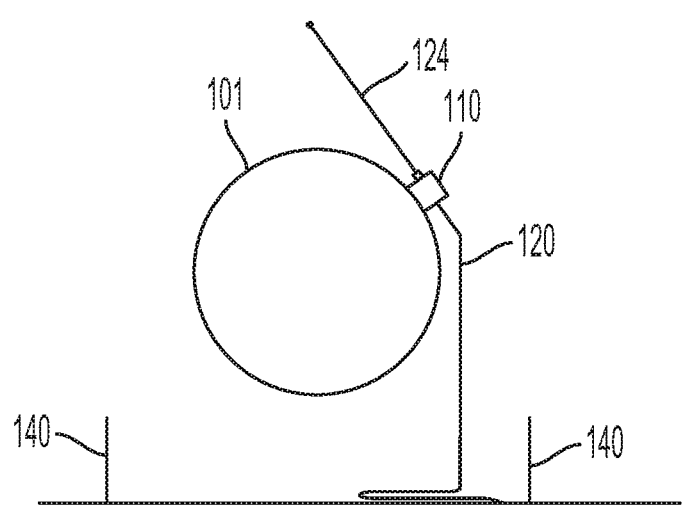
FIG. 6 illustrates a longitudinal view of a robotic printing system for an exterior surface of an aircraft, according to an example implementation.

FIG. 5, shows an example travel path for a robotic printing system 100, accordingly to an example implementation. The robotic printer 110 is shown on the exterior surface 102 of the aircraft 101, following an example travel path 122. In FIG. 5, the robotic printing system 100 includes an umbilical line 120 attached to the body 111 of the robotic printer 110. As discussed above, the umbilical line 120 may convey electrical power and vacuum pressure to the robotic printer 110, among other possibilities. For instance, the umbilical line 120 may convey communications between one or more computing devices that are a part of the robotic printing system 100, or it may supply the print medium 114 to be applied via the printing head 113. Alternatively, the print medium 114 may be provided in cartridges carried by the robotic printer 110, which may be changed out when empty.

As seen in FIG. 5, the robotic printer 110 may follow the travel path 122 along the exterior surface 102 of the aircraft 101. If the print head 113 is located between the plurality of vacuum suction cups 112, as shown in the examples in FIGS. 2-4, the travel path 122 may be designed such that the robot printer 110 does not have to travel back over a section of the exterior surface 102 on which the print medium 113 has just been applied, and thus may still be wet. For example, based on the speed at which the robotic printer 110 travels and the drying time for the print medium 114, it may be possible for the robotic printer 110 to follow a travel path 122 in which the plurality of vacuum suction cups 112 do not travel over immediately adjacent areas when the robotic printer 110 changes directions. Rather, the plurality of vacuum suction cups 112 travel over already-printed portions of the exterior surface 102 after the print medium 113 has had sufficient time to dry. The example travel path 122 shown in FIG. 5 follows such a route.

In an alternative embodiment, the robotic printer 110 may be arranged such that the printing head 113 is mounted outside the pair of parallel treads 116 shown in FIGS. 2 and 3, or outside the plurality of legs 117 shown in FIG. 4. For instance, the printing head 113 may be mounted to an arm that extends laterally from the body 111, such that the print medium 114 is applied along the side of the robotic printer 110 as it moves along the exterior surface 102 of the aircraft 101, outside the path of the treads 116 or the legs 117. In this way, rather than the circuitous travel path 122 shown in FIG. 5, the robotic printer 110 may be able to follow a travel path that follows a stepwise progression down the exterior surface 102, where the printing head 113 applies the print medium 114 just above the travel path in each adjacent pass. Further, depending on the size of the print head 113 and the size and shape of the image 103, the travel path 122 may require more or fewer passes than what is shown by way of example in FIG. 5. For instance, the pattern shown in FIG. 5 may be repeated multiple times along the exterior surface 102.

As shown in FIG. 5, the umbilical line 120 may hang freely from the robotic printer 110 to the ground during the printing operation, and thus, the self-weight of the umbilical line 120 may be accounted for in the required vacuum pressure needed to maintain attachment to the exterior surface 102 of the aircraft 101. Because of the wings extending from the aircraft 101, which may block the umbilical line 120 in such an example, the print medium 114 be applied to a given side of the aircraft 101 in two different sections, forward and aft of the wing.

In some other implementations, the umbilical line 120 may be suspended from a ceiling or other overhead structure. This may reduce the weight that must be carried by the robotic printer 110, and thus necessary vacuum pressure to maintain attachment with the exterior surface 102. In some examples, the umbilical line 120 may be coupled to an overhead track or other support system that allows the suspended umbilical line 120 to move along with the robotic printer 110 as it moves along the exterior surface 102 of the aircraft 101.

In such an example, the suspended umbilical line 120 may be designed with the tensile strength to also act as a fall arrest system to catch the robotic printer 110 in the event it becomes unattached from the exterior surface 102, whether due to a loss of vacuum pressure or any other reason. This may increase the safety for the robotic printing system 100.

Alternatively, in examples where the umbilical line 120 is attached to the robotic printer 110 from the ground, the robotic printing system 100 may further include a lanyard 124 or similar arresting cable attached to the body 111 of the robotic printer 110. Such an example can be seen in FIG. 6, which shows a view along the longitudinal axis of the aircraft 101. The lanyard 124 may be coupled to the ceiling or other overhead structure. Thus, the lanyard 124 may increase the safety of the robotic printing system 100, as discussed above. In some implementations, whether the umbilical line 120, the lanyard 124, or another solution is used as a fall arrest system, the robotic printing system 100 may further include a safety fence 140 surrounding the aircraft 101 to further increase safety in the event of a vacuum pressure loss.

Figure 7:
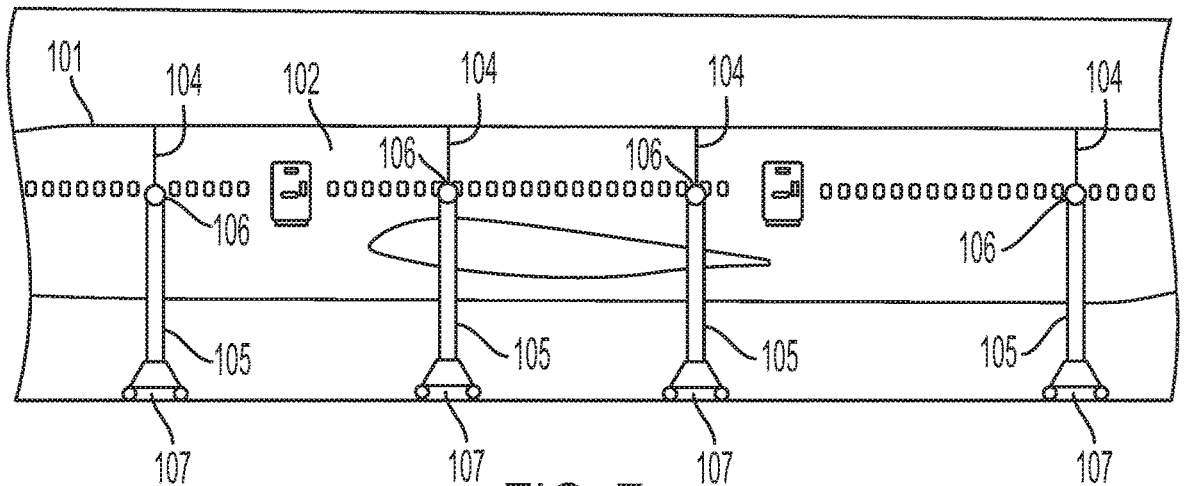
FIG. 7 illustrates a side view of a plurality of external positioning devices for a robotic printing system for an exterior surface of an aircraft, according to an example implementation.
Figure 8:
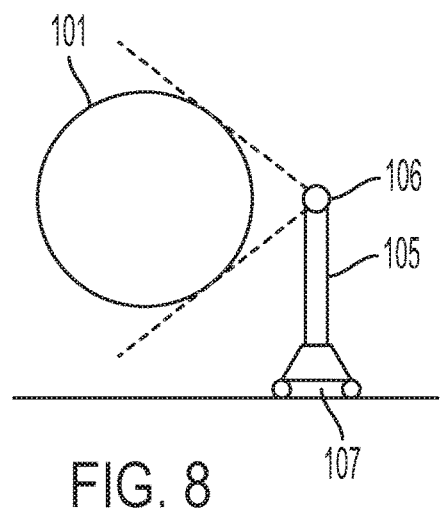
FIG. 8 a longitudinal view of an external positioning device for a robotic printing system for an exterior surface of an aircraft, according to an example implementation.

Turning now to FIGS. 7 and 8, another example of the robotic printing system 100 is shown, according to an example implementation. In some situations, certain surface features 104 may not be in view of the laser-based positioning device 115 from all locations on the exterior surface 102. For instance, the windows may not be within the line of sight 121 of the laser-based positioning device 115 when the robotic printer 110 is near the bottom of the aircraft 101. Accordingly, in some implementations it may be desirable to provide additional references for locating the robotic printer 110. As shown in FIG. 7, the robotic printing system 100 may include a plurality of external positioning devices 105 that are configured to be positioned at predetermined locations 107 surrounding the aircraft 101.

For example, the plurality of external positioning devices 105 may take the form of a plurality of stands that are positioned around the aircraft 101 and then locked into place. The plurality of external positioning devices 105 may be positioned at predetermined locations based on their location relative to surface features 104 on the exterior surface 102 of the aircraft 101. For example, a given external positioning device 105 may be equipped with laser-based positioning tools, such as a vertically projecting laser level, that may allow the external positioning device 105 to be aligned with a particular surface feature 104, such as a vertical join seam in the fuselage of the aircraft 101. Similar laser-based positioning devices may be used to establish a distance of the external positioning device 105 from the aircraft 101, and the distance from one external positioning device 105 to the next.

Each external positioning device 105 in the plurality of external positioning devices 105 may include a reference point 106. Each reference point 106 may be a reflective surface, such as a mirror, that may be detected by the laser-based positioning device 115. In FIGS. 7 and 8, the plurality of reference points 106 are shown at the top of each external positioning device 105, at approximately the horizontal centerline of the aircraft 101 for increased visibility to the laser-based positioning device 115. Accordingly, the laser-based positioning device 115 may be configured to determine relative position data with respect to the laser-based positioning device 115 for each external positioning device 105 within its line of sight 121. The robotic printer 110 is configured to determine the position of the robotic printer 110 on the exterior surface 102 of the aircraft 101 based on the relative position data for each external positioning device 105 in the plurality of external positioning devices 105.

Figure 9:
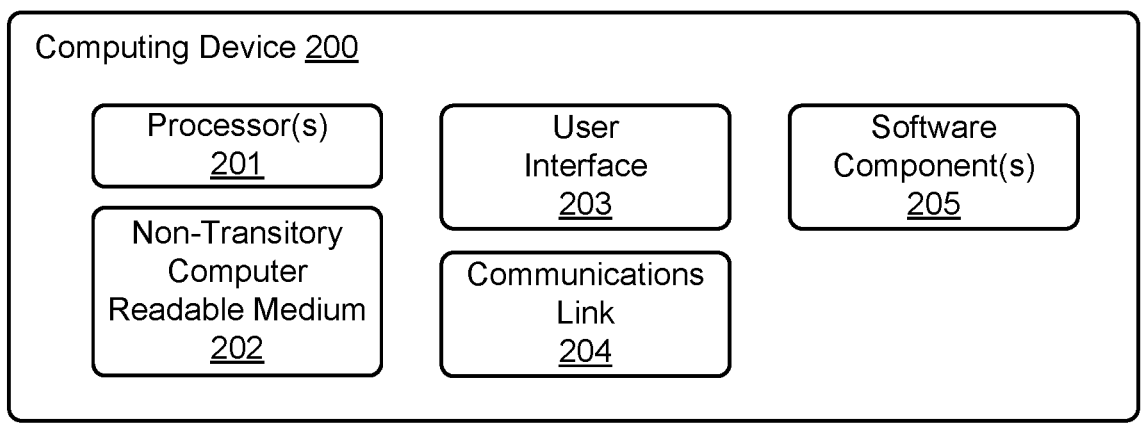
FIG. 9 illustrates a block diagram of an example computing device, according to an example implementation.

FIG. 9 illustrates a block diagram of an example computing device 200 that may form a part of the robotic printing system 100. In some implementations, the computing device 200 may be an onboard computer housed on or within the body 111 of the robotic printer 110, or it may be a remote computer that is communicatively coupled to the robotic printer 110 via a communications link 204. For example, the computing device 200 may be communicatively coupled to the robotic printer 110 via the umbilical line 120 that is attached to the body 111. Additionally or alternatively, the computing device 200 may communicate wirelessly with the robotic printer 110. Further, the computing device 200 shown in FIG. 11 might not be embodied by a single device, but may represent a combination of computing devices that may or may not be in the same location.

The computing device 200 may include a non-transitory, computer readable medium 202 that includes instructions that are executable by one or more processors 201. The non-transitory, computer readable medium 202 may include other data storage as well. For example, the instructions may cause the robotic printing system 100 to determine, via the laser-based positioning device 115, relative position data with respect to the laser-based positioning device 115 for each of a plurality of reference points 106 corresponding to the exterior surface 102 of the aircraft 101. The relative position data may then be stored on the non-transitory, computer readable medium 202.

Based on the relative position data, the instructions may then cause the robotic printing system 100 to determine a position of the robotic printer 110 on the exterior surface 102 of the aircraft 101, and then map the position of the robotic printer 110 to a three-dimensional model of the exterior surface 102. The three-dimensional model includes a representation of the image 103 on the exterior surface 102, and may be stored on the non-transitory, computer readable medium.

Based on the mapping of the robotic printer 110 to the three-dimensional model, the instructions may further cause the robotic printing system to apply, via the printing head 113, the print medium 114 to a location on the exterior surface 102 of the aircraft 101 corresponding to the representation of the image 103 in the three-dimensional model. In conjunction with applying the print medium 114, the instructions may further cause the robotic printing system 100 to move the robotic printer 110 along the exterior surface 102 of the aircraft 101 via the plurality of vacuum suction cups 112.

In some implementations, the computing device 200 also includes a user interface 203 for receiving inputs from a user, and/or for outputting operational data to a user. The user interface 203 might take the form of a control panel located on the robotic printer 110, or a graphical user interface at a remote location, connected to the robotic printer 110 wirelessly or via the umbilical line 120, among other examples. For instance, a command for the robotic printer 110 to return to the initial mounting position may be received from a remote user via the user interface 203 of the computing device 200. The command may be communicated to robotic printer 110 via the umbilical line 120, or wirelessly as discussed above. In other examples, a return command might be initiated automatically, based on predetermined parameters stored on the non-transitory, computer readable medium 202, such as a remaining quantity of the print medium 114 in an onboard cartridge. Other possibilities also exist.

In addition, the non-transitory, computer readable medium 202 may be loaded with one or more software components 205 stored on the computer readable medium 202 and executable by the processor 201 to achieve certain functions.

For example, the robotic printing system 100 may include various systems that contribute to its operation, such as a vacuum suction system, a positioning system for the positioning motor 119, and a three-dimensional mapping system, among other examples. Each of these systems may be operated in part by software components 205 housed on the non-transitory, computer readable medium 202 and executable by the processor 201.

Figure 10:
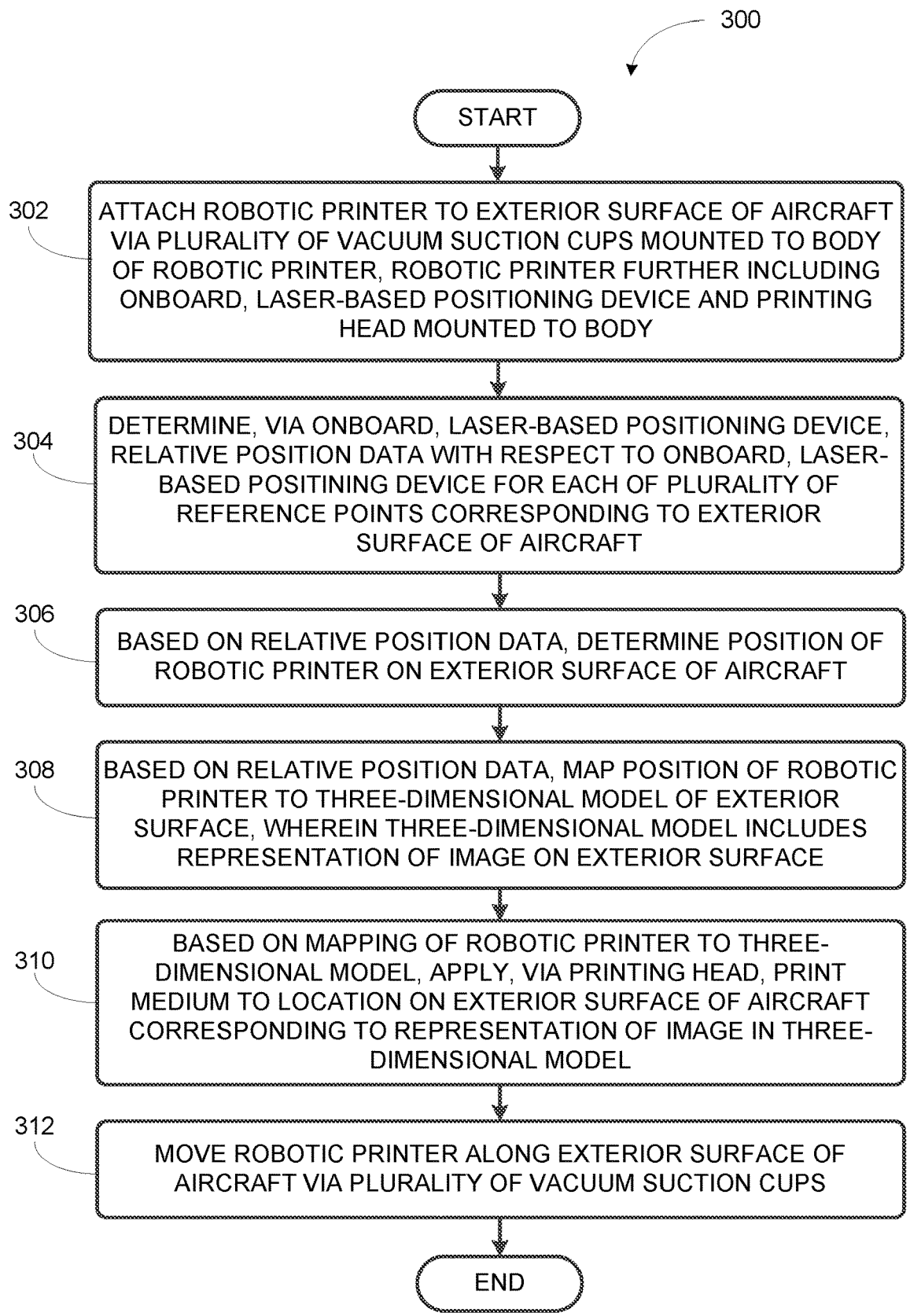
FIG. 10 shows a flowchart of an example method of printing an image on an exterior surface of an aircraft, according to an example implementation.

Turning now to FIG. 10, a flowchart of a method 300 for printing an image on an exterior surface of an aircraft is shown, according to an example implementation. Method 300 shown in FIG. 10 presents an example of a method that, for instance, could be used with the robotic printing system 100, as shown in FIGS. 1-9 and discussed herein. It should be understood that for these and other processes and methods disclosed herein, flowcharts show functionality and operation of one possible implementation of present examples. In this regard, each block in a flowchart may represent a module, a segment, or a portion of program code, which includes one or more instructions executable by a processor for implementing or causing specific logical functions or steps in the process. For example, the method 300 may be implemented by one or more computing devices, such as the computing device 200 as shown in FIG. 9 and discussed herein. Alternative implementations are included within the scope of the examples of the present disclosure, in which functions may be executed out of order from that shown or discussed, including substantially concurrently, depending on the functionality involved, as would be understood by those reasonably skilled in the art.

At block 302, the method 300 includes attaching a robotic printer, such as the robotic printer 110 discussed above, to the exterior surface 102 of the aircraft 101 via a plurality of vacuum suction cups 112 mounted to a body 111 of the robotic printer 110. The robotic printer 110 further includes a laser-based positioning device 115 and a printing head 113 mounted to the body 111, as discussed above.

In some implementations, the plurality of vacuum suction cups 112 are arranged on a pair of parallel treads 116, as shown in FIGS. 2 and 3, which rotate to move the robotic printer 110 along the exterior surface 102 of the aircraft 101. In other implementations, the plurality of vacuum suction cups 112 are arranged at respective ends 118 of a plurality of legs 117, as shown in FIG. 4.

At block 304, the method 300 includes determining, via the laser-based positioning device 115, relative position data with respect to the laser-based positioning device 115 for each of a plurality of reference points 106 corresponding to the exterior surface 102 of the aircraft 101. As discussed above, the laser-based positioning device includes a line of sight 121, and the exterior surface 102 of the aircraft 101 may include a plurality of surface features 104. In some implementations, the surface features 104 may serve as the reference points 106, and the method 300 at block 304 may include determining relative position data with respect to the laser-based positioning device 115 for each surface feature 104 within its line of sight 121.

In some other implementations, a plurality of external positioning devices 105 are positioned at predetermined locations 107 surrounding the aircraft 101, as shown in FIGS. 7 and 8 and discussed above. Each external positioning device 105 includes a reference point 106, such as a mirror, which may be within the line of sight 121 of the laser-based positioning device 115. Because the plurality of external positioning devices 105 are positioned at known locations around the aircraft 101, the position of each reference point 106 is known relative to the exterior surface 102 of the aircraft 101. Accordingly, the method 300 at block 304 may include determining relative position data with respect to the laser-based positioning device 115 for each external positioning device 105 within its line of sight 121.

At block 306, the method 300 includes, based on the relative position data, determining a position of the robotic printer 110 on the exterior surface 102 of the aircraft 101. At block 308, the method further includes, based on the relative position data, mapping the position of the robotic printer 110 to a three-dimensional model of the exterior surface 102. The three-dimensional model includes a representation of the image 103 on the exterior surface 102.

At block 310, the method 300 includes, based on the mapping of the robotic printer 110 to the three-dimensional model, applying, via the printing head 113, a print medium 114 to a location on the exterior surface 102 of the aircraft 101 corresponding to the representation of the image 103 in the three-dimensional model. For example, the robotic printer 110 may move along a travel path 122, as shown in FIG. 5, and continuously map its position to the three-dimensional model of the exterior surface 102. At appropriate locations corresponding to the representation of the image 103 in the model, the robotic printer 110 may apply the print medium 114.

In some implementations, where the printing head 113 is mounted to the robotic printer 110 between the pair of parallel treads 116, applying the print medium 114 to the exterior surface 102 of the aircraft 101 via the printing head 113 includes applying the print medium 114 between the pair of parallel treads 116. Alternatively, where the printing head 113 is mounted to the robotic printer 110 outside the pair of parallel treads 116, applying the print medium 114 to the exterior surface 102 of the aircraft 101 via the printing head 113 includes applying the print medium 114 outside the pair of parallel treads 116.

As discussed above, the robotic printer 110 may include a positioning motor 119 coupled to the printing head 113 to adjust the location of the printing head 113. Thus, in some implementations, the method 300 may further include, based on the position of the robotic printer 110 on the exterior surface 102 of the aircraft 101 and the mapping of the robotic printer 110 to the three-dimensional model, adjusting, via the positioning motor 119, the position of the printing head 113 relative to the plurality of vacuum suction cups 112.

At block 312, the method 300 includes moving the robotic printer 110 along the exterior surface 102 of the aircraft 101 via the plurality of vacuum suction cups 112. As noted above, the robotic printer 110 may move via the rotation of the pair of parallel treads 116, or via the articulation of the plurality of legs 117.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A robotic printing system for an exterior surface of an aircraft comprising:
   a robotic printer, the robotic printer comprising:
   a body;

a pair of parallel treads coupled to the body, wherein the pair of parallel treads include multiple connected links arranged around drive wheels;

a plurality of vacuum suction cups mounted to the body for attaching the robotic printer to the exterior surface of the aircraft, wherein the plurality of vacuum suction cups are configured to move the robotic printer along the exterior surface of the aircraft, wherein the plurality of vacuum suction cups are arranged on the multiple connected links of the pair of parallel treads that are configured to drive the robotic printer along the exterior surface of the aircraft, wherein the pair of parallel treads rotate around the drive wheels to move the robotic printer along the exterior surface of the aircraft;

a printing head mounted to the body, wherein the printing head is positioned to apply a print medium to the exterior surface of the aircraft; and a laser-based positioning device mounted to the body for determining a position of the robotic printer on the exterior surface of the aircraft.

2. The robotic printing system of claim 1, wherein the printing head is mounted to the robotic printer between the pair of parallel treads.

3. The robotic printing system of claim 1, wherein the printing head is mounted to the robotic printer outside the pair of parallel treads.

4. The robotic printing system of claim 1, wherein the robotic printer further comprises a positioning motor coupled to the printing head, wherein the positioning motor is configured to adjust a position of the printing head relative to the plurality of vacuum suction cups.

5. The robotic printing system of claim 1, further comprising:

an umbilical line attached to the body of the robotic printer, wherein the umbilical line conveys one or more of electrical power and vacuum pressure to the robotic printer.

6. The robotic printing system of claim 1, wherein the laser-based positioning device comprises a line of sight, wherein the exterior surface of the aircraft comprises a plurality of surface features, and wherein the robotic printer is configured to determine relative position data with respect to the laser-based positioning device for each surface feature within its line of sight, and wherein the robotic printer is configured to determine the position of the robotic printer on the exterior surface of the aircraft based on the relative position data for each surface feature in the plurality of surface features.

7. The robotic printing system of claim 1, wherein the laser-based positioning device comprises a line of sight, the robotic printing system further comprising:

a plurality of external positioning devices configured to be positioned at pre-determined locations surrounding the aircraft, wherein the robotic printer is configured to determine relative position data with respect to the laser-based positioning device for each external positioning device within its line of sight, and wherein the robotic printer is configured to determine the position of the robotic printer on the exterior surface of the aircraft based on the relative position data for each external positioning device in the plurality of external positioning devices.

8. The robotic printing system of claim 1, further comprising a computing device, the computing device comprising:

one or more processors; and a non-transitory, computer readable medium having stored thereon instructions, that when executed by the one or more processors, cause the robotic printing system to perform functions comprising:

determining, via the laser-based positioning device, relative position data with respect to the laser-based positioning device for each of a plurality of reference points corresponding to the exterior surface of the aircraft;

based on the relative position data, determining the position of the robotic printer on the exterior surface of the aircraft;

based on the relative position data, mapping the position of the robotic printer to a three-dimensional model of the exterior surface, wherein the three-dimensional model includes a representation of an image on the exterior surface;

based on the mapping of the robotic printer to the three-dimensional model, applying, via the printing head, a print medium to a location on the exterior surface of the aircraft corresponding to the representation of the image in the three-dimensional model; and moving the robotic printer along the exterior surface of the aircraft via the plurality of vacuum suction cups.

9. The robotic printing system of claim 8, wherein the computing device is communicatively coupled to the robotic printer via an umbilical line attached to the body of the robotic printer.

10. The robotic printing system of claim 1, further comprising a respective drive motor for each of the pair of parallel treads to drive rotation of the pair of parallel treads.

11. A robotic printing system for an exterior surface of an aircraft comprising:

a robotic printer, the robotic printer comprising:
a body;
a plurality of vacuum suction cups mounted to the body for attaching the robotic printer to the exterior surface of the aircraft, wherein the plurality of vacuum suction cups are configured to move the robotic printer along the exterior surface of the aircraft;
a printing head mounted to the body, wherein the printing head is positioned to apply a print medium to the exterior surface of the aircraft;
a laser-based positioning device mounted to the body for determining a position of the robotic printer on the exterior surface of the aircraft, wherein the laser-based positioning device comprises a line of sight; and a plurality of external positioning devices configured to be positioned at pre-determined locations surrounding the aircraft, wherein the robotic printer is configured to determine relative position data with respect to the laser-based positioning device for each external positioning device within its line of sight, and wherein the robotic printer is configured to determine the position of the robotic printer on the exterior surface of the aircraft based on the relative position data for each external positioning device in the plurality of external positioning devices.

12. The robotic printing system of claim 11, wherein the plurality of vacuum suction cups are arranged on a pair of parallel treads configured to drive the robotic printer along the exterior surface of the aircraft.

13. The robotic printing system of claim 11, wherein the printing head is mounted to the robotic printer between the pair of parallel treads.

14. The robotic printing system of claim 11, wherein the plurality of vacuum suction cups are arranged at respective ends of a plurality of legs configured to move the robotic printer along the exterior surface of the aircraft.

15. The robotic printing system of claim 11, wherein the robotic printer further comprises a positioning motor coupled to the printing head, wherein the positioning motor is configured to adjust a position of the printing head relative to the plurality of vacuum suction cups.

16. The robotic printing system of claim 11, further comprising:
   an umbilical line attached to the body of the robotic printer, wherein the umbilical line conveys one or more of electrical power and vacuum pressure to the robotic printer.

17. The robotic printing system of claim 11, wherein the exterior surface of the aircraft comprises a plurality of surface features, and wherein the robotic printer is configured to determine additional relative position data with respect to the laser-based positioning device for each surface feature within its line of sight, and wherein the robotic printer is configured to determine the position of the robotic printer on the exterior surface of the aircraft further based on the additional relative position data for each surface feature in the plurality of surface features.

18. The robotic printing system of claim 17, wherein the functions further comprise:
   based on the mapping of the robotic printer to the three-dimensional model, applying, via the printing head, a print medium to a location on the exterior surface of the aircraft corresponding to the representation of the image in the three-dimensional model; and
   moving the robotic printer along the exterior surface of the aircraft via the plurality of vacuum suction cups.

19. The robotic printing system of claim 17, wherein the computing device is communicatively coupled to the robotic printer via an umbilical line attached to the body of the robotic printer.

20. The robotic printing system of claim 11, further comprising a computing device, the computing device comprising:
   one or more processors; and
   a non-transitory, computer readable medium having stored thereon instructions, that when executed by the one or more processors, cause the robotic printing system to perform functions comprising:
      determining, via the laser-based positioning device, additional relative position data with respect to the laser-based positioning device for each of a plurality of reference points corresponding to the exterior surface of the aircraft;
      based on the additional relative position data, further determining the position of the robotic printer on the exterior surface of the aircraft; and
      based on the additional relative position data, mapping the position of the robotic printer to a three-dimensional model of the exterior surface, wherein the three-dimensional model includes a representation of an image on the exterior surface.

\* \* \* \* \*